3,245,494
SPEED GOVERNORS AND CONTROLS
Donald J. Baxter, South Euclid, Ohio, assignor to Curtiss-Wright Corporation, a corporation of Delaware
Filed Feb. 27, 1963, Ser. No. 261,427
7 Claims. (Cl. 180—82.1)

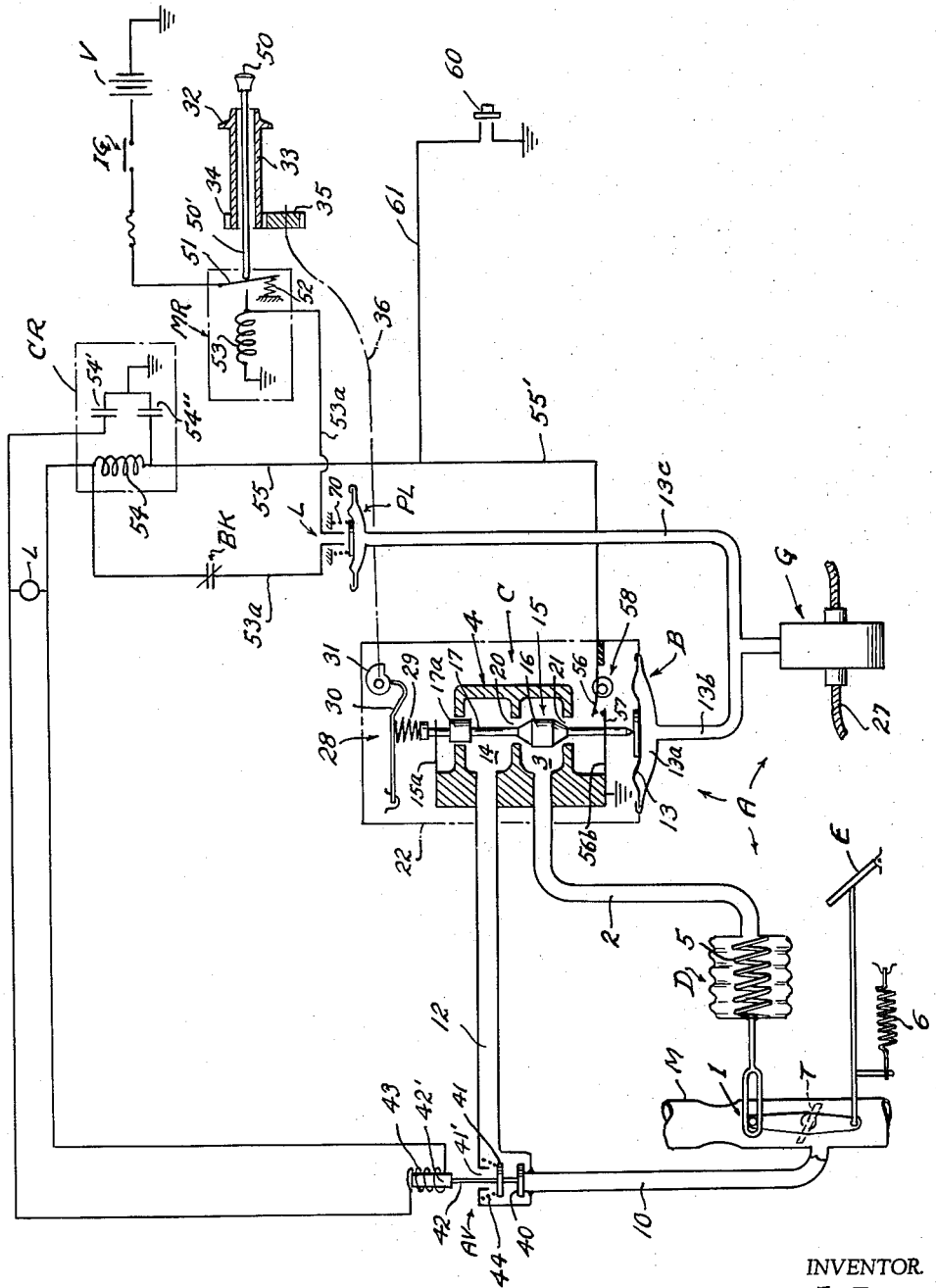

This invention relates to speed governors, particularly for automotive vehicle engines, of the type shown in my application for United States Letters Patent Serial No. 212,840, filed July 27, 1962, and now Patent No. 3,185,-248, owned by the assignee hereof.

The governor and control arrangement hereof is especially adapted for controlling an internal combustion engine of a vehicle to maintain automatically preselected engine and vehicle speeds despite changes in gradient of the roadway. The governor and controls hereof are also basically similar to those of said assignee's U.S. Patent 3,023,828, issued March 6, 1962. Therein a main governing unit is constituted by a fluid-operated servomotor connected automatically to control the engine fuel input and forming part of a pneumatic servomechanism including an essentially frictionless pilot valve which continuously and accurately controls the rate of flow of operating fluid to the servomotor, and a speed sensing or error detecting mechanism including a centrifugal liquid pressure generator connected for operation as by the vehicle transmission mechanism or other means driven in synchronism with the engine and whose output causes movements of the pilot valve as needed to make engine fuel corrections. If failure of the pressure generator or disruption of its output line or connected fluid spaces should occur the engine can be caused to accelerate undesirably —e.g., until the automatic governing mechanism is deactivated as by a manual operation. The present control arrangement eliminates possibility of such undesirable acceleration or in other words adds a fail-safe feature to the governor and controls shown by said patent and those of said application.

In my said application the controls include means for activating the governor prior to attainment by the vehicle of manually selected automatic governing speeds, so that the driver of the vehicle is not required to cause acceleration of the vehicle up to or past set governing speed in order to attain automatic governing. Such preconditioning of the governor mechanism is desirable, inter alia, in that it makes it unnecessary to exceed the selected automatic governing speed even momentarily as a condition precedent to attainment of automatic governing operation. It is however capable of causing the engine to accelerate to undesirably high speeds while the vehicle is standing still or is being driven slowly. The present control arrangement in addition to the previously mentioned fail-safe feature prevents the governor from assuming automatic control of the engine throttle prior to attainment of vehicle speeds for example within a desired automatic governing range, thus being much safer under circumstances such as when the vehicle is being handled by minors or parking attendants unfamiliar with the governing mechanism or functions or when the vehicle is being driven slowly as required by traffic conditions or low speed zoning.

Objects and features of the invention not made apparent above will be brought out in the following description. The essential characteristics of the invention are summarized in the claims.

In the drawing the single view is a partly mechanical and partly electrical schematic or diagram showing the essentials of one form of the present governor and its controls.

In the drawing the automatic control or governor mechanism A comprises a speed sensing motor unit B, a pressure generator G connected thereto, and a pilot valve mechanism C of the pneumatic amplifier or servomechanism which includes a servo or motor portion separately shown at D in the form of a flexible bellows or diaphragm device. Speed sensing unit or motor B is shown as a flexible diaphragm 13 in a pressure chamber 13a containing fluid supplied through a tube 13b connected to the output of pressure generator G. Mechanism G can be essentially that disclosed in assignee's Patent 2,990,825, issued July 4, 1961 (FIGS. 2 and 2a thereof), and the mechanism is preferably driven by the vehicle transmission unit (not shown) through a flexible shaft partially shown at 27.

Servo or motor D, as shown, is operated by engine vacuum and has a one-way-operating (pull) connection 1 with an engine control member such as throttle valve T in engine intake passage M, variably to open the throttle as in already known automatic road speed regulators. A passage (e.g., flexible conduit) 2 connected at one end to the motor D and at its opposite end to an air chamber 3 of a valve body 4 of the pilot valve unit C enables delicately metered application of engine vacuum to the motor D against the force of a return spring 5 in or connected to the motor. The throttle valve T, as usual, is arranged for "manual" control as by an accelerator pedal E having a return spring 6 tending to close the throttle.

A vacuum line or passage 10 (e.g., flexible conduit) is connected at one end to the engine intake passage or manifold downstream from the throttle T and its opposite end is connected to the inlet of an air valve unit AV, opening of which initiates activation of the governor mechanism.

The outlet of the air valve AV is connected by a passage or conduit 12 to a vacuum chamber 14 of the pilot valve body 4. The pilot valve mechanism C controls the degree or intensity of vacuum in the chamber of motor or servo D according to the position of a freely suspended, hence approximately frictionless modulating valve plunger 15 in the valve body 4. Two parallel leaf springs 15a and 56b are mounted on the valve body 4, having their free ends tightly connected to the valve plunger 15.

The valve plunger 15, which for convenience will hereinafter usually be called the pilot valve, has a double conical metering plug portion 16 on a suitable rod or stem 17, one end of the plug portion being arranged variably to restrict or close an orifice or port 20 between the vacuum chamber 14 and the air chamber 3 of valve body 4. The opposite end of the plug portion 16 variably restricts or closes an orifice 21 in the valve body 4 leading to a region around the valve body which is subjected approximately to atmospheric pressure as in a housing diagrammically indicated 22. The housing has an air filter, not shown, detachably closing or forming one side wall of the housing which is otherwise fully closed.

One end of the stem 17 of the pilot valve 15 is subjected to vehicle (or engine) speed signal force via the diaphragm 13 of motor device B. At the opposite end of the pilot valve stem 17 is a speed setting mechanism 28 including a speeder spring 29, a lever 30 acting against one end of the speeder spring, and a rotary cam 31 against which the speeder spring holds one end of the lever at all times. The cam 31 is manually adjusted to set or select the desired automatic governing speed by a knob 32 within reach of the driver. The knob 32 via a tubular supporting shaft 33 thereof and mating gears 34 and 35 is connected via a torque shaft assembly 36 to the cam 31. To compensate for changes in vacuum intensity with load change in valve chamber 14, the valve stem 17 has a piston 17a thereon which nearly closes an associated bore in the valve body wall defining the chamber 14.

Referring to the illustrated largely-electrical controls, the air valve AV (left) has two plug portions 40 and 41 on a stem 42 connected to the armature 42' of a solenoid coil 43. The stem 42 is operated by a spring 44 in a direction to close plug 40 and seal the inlet of vacuum or air passage 10 leading to the engine manifold. When the solenoid coil 43 is energized to activate the governor the other plug portion 41 closes a port 41' connected with atmosphere.

Current from a suitable source V in the illustrated conventionally grounded electrical system flows through an ignition switch unit IG and a suitable fuse to a make-ready switch unit MR operated manually to establish a "holding" circuit as by a knob 50 whose operating rod 50' extends through the hollow shaft 33 for connection with a contact member 51 of the switch unit MR having a spring 52 tending to hold the switch open.

The holding coil 53 of the unit MR conditionally enables supply of current through a series circuit 53a leading to the air valve coil 43 and including a normally closed (brake and/or clutch) switch BK and a normally open lock-out switch L, described later, to a coil 54 of a second magnetically locked in or holding relay switch CR (clicker relay) and to the air valve solenoid coil 43 to open the air valve as soon as the normally open contacts 54' and 54" of the relay switch unit CR are closed. Those contacts remain open until the circuit portion 53a including the coil 54 of relay CR is closed; and circuit-closing is accomplished, for example, when a circuit portion 55, 55' connected to the coil 54 and to a contact 56 of a switch 58 in the pilot valve unit B is energized. The switch 58 is operated to close its contacts 56 and 57 incident to movement of the pilot valve 15 upon attainment of set governing speed by the vehicle under manual control. A visible signal (e.g., light bulb L) is shown in parallel with the control circuit portion connecting relay CR to the air valve actuating coil 43.

The governor-operated switch contacts 56 and 57 are calibrated or adjusted, as explained in my above-identified application, to close the connected governor-activating circuit (energizing air valve coil 43) when the vehicle speed is increased from standstill to a point slightly higher than the governing speed as established by setting of the speeder spring 29 during previous operation of the vehicle when under automatic governor control or according to witness marks (not shown) associated with the speed-selector knob 32. Thereby, during automatic governor operation (on speed) the contacts 56 and 57 normally remain separated.

In order to enable activation of the governor A for automatic control of the engine prior to attainment on part of the vehicle of set governing speed, or so that no exceeding of set speed is ever necessary, a normally open (e.g., spring opened) push-button switch 60 (as in my said application) is connected via a sub-circuit line 61 in parallel with the pilot-valve-operated switch 58 in reference to the clicker relay coil 54. Closing of push-button-type switch 60 in the present arrangement is prevented from energizing the clicker relay coil 54 and the rest to activate the governor until the normally open lockout switch L is closed; and closing of that switch is made conditional upon the vehicle speed during acceleration having been brought, as by manipulation of the accelerator pedal E, to within the desired automatic governing range. That range, via design and calibration, is usually between 25 m.p.h. and a desired maximum vehicle speed. Thereby the engine cannot for example as a result of closing of switch 60 be caused to race or accelerate automatically toward governing speed while the vehicle is at standstill (clutch disengaged or in neutral), and cannot be conditioned for automatic acceleration while the vehicle is being driven slowly as in low gear ratios or in heavy traffic. The threshold speed (for closing switch L) can by design be any speed above zero but for practical purposes it is preferably within the low speed portion of the automatic governing range.

Closing of lockout switch L to energize circuit line 53a is, as shown, made conditional upon attainment of the desired threshold vehicle speed through provision of a suitable diaphragm or bellows type motor PL connected as by a branch passage or conduit 13c to the output of pressure generator G or in parallel with speed sensing diaphragm motor device B. Thus the contacts of lockout switch L remain separated as by action of a spring 70 or its equivalent until a predetermined or threshold vehicle-speed-signal-output-pressure is being supplied by the speed-pressure generator G.

In an actual construction (not shown) the diaphragm or bellows of lockout-switch-operating motor PL operates a two-way snap action or toggle switch in line 53a having its own spring serving in the place of spring 70 normally to maintain the lockout switch open.

It will be evident that, in addition to preventing premature or unsafe operation of the governor mechanism A by the push-button switch 60, the motor PL and lockout switch L in event of rupture of the pressure generator output passages 13b or 13c or either of the connected flexible diaphragms or further in case the pressure generator G fails to operate (e.g., flexible drive shaft 27 breaks) the governor fails safe or in other words control of the engine is wholly returned to the driver of the vehicle. The governor mechanism A also fails safe in event any of the vacuum lines or connected pressure chambers become ruptured (function of servomotor spring 5).

I claim:

1. In an engine governing system, a governor wherein a pilot valve member of a fluid pressure operated amplifier including a fluid motor connected to control the speed of the engine is operated automatically to control the engine speed at selectable points, an electrical control circuit, an electrically operated device in the circuit connected to activate the governor for automatic control of the engine speed, a normally open switch in the circuit and means acting in response to attainment of a selected point in engine speed and connected to close the switch, and energize said device, a normally open lock-out switch in the control circuit in series with the electrically operated device, and requiring closure for activation of the governor, and means responsive to attainment of a higher than zero engine speed but bleow the selected point and operating, upon such attainment, to close the lock-out switch.

2. In a motor vehicle engine governing system, a governor wherein a pilot valve member of a fluid pressure operated amplifier including a fluid motor connected to control the speed of the engine is operated automatically to control the vehicle speed at selectable points, an electrical control circuit, an electrically operated device in the circuit connected to activate the governor for automatic control of the vehicle speed, a normally open switch in the circuit and means acting in response to attainment of a selected point in vehicle speed and connected to close the switch and energize said device, a normally open lock-out switch in the control circuit in series with the electrically operated device, and requiring closure for activation of the governor, and means responsive to attainment of a higher than zero vehicle speed but below the selected point and operating, upon such attainment, to close the lock-out switch.

3. In a motor vehicle engine governing system, a governor wherein a pilot valve member of a fluid pressure operated amplifier including a fluid motor connected to control the speed of the engine is operated automatically to control the engine or vehicle speed at selectable points within a predetermined automatic governing range, an electrical control circuit, an electrically operated device in the circuit connected to activate the governor for automatic control of the engine or vehicle speed, a normally open switch in the circuit and fluid pressure operated means responsive to attainment of a selected point in engine or vehicle speed within said range and connected to close the switch, and energize said device, a normally open lock-out switch in the control circuit in series with the electrically operated device, and fluid pressure operated means responsive to attainment of a predetermined threshold engine or vehicle speed and operating, upon such attainment, to close the lock-out switch.

4. In a motor vehicle engine governing system, a governor wherein a pilot valve member of a fluid pressure operated amplifier including a fluid motor connected to control the speed of the engine is operated automatically to control the vehicle speed at selectable points within a predetermined automatic governing range, an electrical control circuit, an electrically operated device in the circuit connected to activate the governor for automatic control of the vehicle speed, a normally open switch in the circuit and means responsive to attainment of a selected point in vehicle speed within said range and connected to close the switch, a sub-circuit connected in parallel with said switch, a manually operable normally open switch in the sub-circuit for enabling activation of the governor at a lower point in vehicle speed than closing of the first mentioned switch can result in activation of the governor, a normally open lockout switch in the control circuit in series with the electrically operated device, and means responsive to attainment of a higher than zero vehicle speed and operating, upon such attainment, to close the lock-out switch.

5. In an engine governing system, a governor organized as a fluid pressure operated amplifier including a fluid motor connected to control the speed of the engine and a spring biased pilot valve connected to control the operation of the fluid motor, speed error detecting means driven in synchronism with the engine and having output means connected for automatic operation of the pilot valve in a direction tending to cause decrease in engine speed via the governor with rise in engine speed, an electrical control circuit, an electrically operated device in the circuit connected to activate the governor for automatic control of engine speed, means including a normally open switch in the circuit arranged for operation to closed position by said error detecting means at a predetermined engine speed to render said device continuously operative to activate the governor, a normally open lockout switch in series with said device in the circuit, and threshold speed sensitive means connected to said output means for operation thereby and operating via the lockout switch to deenergize said device in event of malfunctioning or failure of the speed error detecting means.

6. In an engine governing system, a governor organized as a fluid pressure operated amplifier including a fluid motor connected to control the speed of the engine and a spring biased pilot valve connected to control the operation of the fluid motor, a fluid pressure generator driven in synchronism with the engine and having output means connected for automatic operation of the pilot valve in a direction tending to cause decrease in engine speed via the governor with rise in generator output pressure, an electrical control circuit, an electrically operated device in the circuit connected to activate the governor for automatic control of engine speed, means including a normally open switch in the circuit arranged for operation to closed position by said output means of the generator at a predetermined engine speed to render said device continuously operative to activate the governor, a normally open lockout switch in series with said device in the circuit, and threshold-pressure-sensitive means connected to the generator output means for operation thereby and operating via the lockout switch to deenergize said device in event of failure of the generator to maintain threshold pressure.

7. In an engine governing system, a governor wherein a pilot valve member of a fluid pressure operated amplifier including a fluid motor connected to control the speed of the engine is operated automatically to control the engine speed at selectable points, an electrical control circuit, an electrically operated device in the circuit connected to activate the governor for automatic control of the engine speed, a normally inactive control means in the circuit and means acting in response to attainment of a selected point in engine speed and connected to activate the said control means, and energize said device, a normally open lock-out switch in the control circuit in series with the electrically operated device, and requiring closure for activation of the governor, and means responsive to attainment of a higher than zero engine speed but below the selected point and operating, upon such attainment, to close the lock-out switch.

References Cited by the Examiner

UNITED STATES PATENTS

| 2,990,825 | 7/1961 | Fuller et al. | 180—82.1 X |
| 3,023,828 | 3/1962 | Fuller et al. | 180—82.1 |
| 3,092,090 | 6/1963 | Berninger | 123—103 |

BENJAMIN HERSH, *Primary Examiner.*

A. HARRY LEVY, PHILIP ARNOLD, *Examiners.*